(12) United States Patent
Krishnan et al.

(10) Patent No.: US 11,288,397 B2
(45) Date of Patent: Mar. 29, 2022

(54) MASKING TEXT DATA FOR SECURE MULTIPARTY COMPUTATION

(71) Applicant: International Business Machines Corporation, Armonk, NY (US)

(72) Inventors: Padmanabhan Krishnan, Bengaluru (IN); Vaibhav Murlidhar Kulkarni, Bengaluru (IN); Gopikrishnan Varadarajulu, Bengaluru (IN); Rakhi S. Arora, Bengaluru (IN); Samir Katti, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 16/558,623

(22) Filed: Sep. 3, 2019

(65) Prior Publication Data
US 2021/0064779 A1 Mar. 4, 2021

(51) Int. Cl.
*G06F 21/62* (2013.01)
*H04L 9/30* (2006.01)

(52) U.S. Cl.
CPC ............ *G06F 21/6245* (2013.01); *H04L 9/30* (2013.01); *H04L 2209/04* (2013.01);
(Continued)

(58) Field of Classification Search
CPC .............. G06F 21/6245; G06F 21/602; G06F 21/6254; G06F 21/6263; G06F 21/72;
(Continued)

(56) References Cited

U.S. PATENT DOCUMENTS

| | | | |
|---|---|---|---|
| 6,438,516 B1 * | 8/2002 | Davis .................... | G06F 40/126 704/8 |
| 7,181,017 B1 * | 2/2007 | Nagel ................... | H04L 9/0825 380/282 |

(Continued)

OTHER PUBLICATIONS

A. Lapets, N. Volgushev, A. Bestavros, F. Jansen and M. Varia, "Secure MPC for Analytics as a Web Application," 2016 IEEE Cybersecurity Development (SecDev), 2016, pp. 73-74, doi: 10.1109/SecDev.2016.027.*

(Continued)

*Primary Examiner* — David Garcia Cervetti
(74) *Attorney, Agent, or Firm* — Yee & Associates, PC.

(57) ABSTRACT

Textual masking for multiparty computation is provided. The method comprises receiving masked input data from a number of contributors, wherein the input data from each contributor has a unique contributor mask value. A unique analyst mask factor is received for each contributor, computed by an analyst as a difference between a uniform analyst mask value and the contributor mask value. An API call is received from the analyst to aggregate the input data from the contributors. The respective analyst mask factors are added to the input data from the contributors, and the data is aggregated and shuffled. Computational results received from the analyst based on the aggregated input data are published. In response to API calls from the contributors, the analyst mask factors are removed from the computational results, wherein computational results received by each contributor are masked only by the respective contributor mask value.

20 Claims, 8 Drawing Sheets

(52) U.S. Cl.
CPC ...... *H04L 2209/08* (2013.01); *H04L 2209/34* (2013.01); *H04L 2209/46* (2013.01)

(58) Field of Classification Search
CPC ....... G06F 21/6227; H04L 9/30; H04L 9/008; H04L 2209/46; H04L 2209/08; H04L 2209/38; H04L 9/0643; H04L 2209/34; H04L 2209/04; H04L 2209/046; H04L 9/085; H04L 9/14; H04L 2209/56; H04L 9/3239; H04L 9/003; H04L 9/0637; H04L 2209/16; H04L 9/3066; H04L 2209/88; H04L 9/3247

See application file for complete search history.

(56) References Cited

U.S. PATENT DOCUMENTS

| | | | | |
|---|---|---|---|---|
| 8,566,247 B1* | 10/2013 | Nagel | ................... | H04L 63/061 705/59 |
| 9,432,342 B1* | 8/2016 | Kothari | ................... | H04L 9/08 |
| 9,437,019 B2* | 9/2016 | Naveh | ................... | G06T 11/60 |
| 10,083,310 B1* | 9/2018 | Lampkins | ............ | G06F 21/606 |
| 10,650,032 B1* | 5/2020 | Laurence | ............ | G06F 16/335 |
| 10,664,508 B1* | 5/2020 | Laurence | ............ | G06F 16/903 |
| 10,803,197 B1* | 10/2020 | Liao | ................... | G06F 21/604 |
| 10,812,252 B2* | 10/2020 | Laine | ................ | G06F 9/30014 |
| 10,951,479 B1* | 3/2021 | Gupta | ................... | H04L 47/125 |
| 2006/0085761 A1* | 4/2006 | Allen | ................... | G06F 40/174 715/780 |
| 2006/0265649 A1* | 11/2006 | Danilo | ................. | G06F 40/126 715/256 |
| 2009/0132419 A1* | 5/2009 | Grammer | ............ | G06F 21/6245 705/50 |
| 2009/0147958 A1* | 6/2009 | Calcaterra | ............. | H04L 9/0833 380/260 |
| 2011/0087885 A1* | 4/2011 | Lerner | .................... | H04L 9/002 713/168 |
| 2011/0202766 A1* | 8/2011 | Lerner | .................... | H04L 67/38 713/168 |
| 2013/0104239 A1* | 4/2013 | McLachlan | ............. | G06F 7/588 726/26 |
| 2015/0161397 A1 | 6/2015 | Cook et al. | | |
| 2015/0327033 A1* | 11/2015 | Kalman | .................. | G09G 5/363 455/466 |
| 2016/0156611 A1* | 6/2016 | Rozman | .................. | G06F 21/31 713/168 |
| 2016/0379010 A1* | 12/2016 | Farkash | .............. | G06F 21/6245 726/1 |
| 2017/0195274 A1* | 7/2017 | Liberty | .................... | H04L 51/22 |
| 2017/0230171 A1* | 8/2017 | Gadepally | ............. | G06F 16/258 |
| 2017/0242924 A1* | 8/2017 | Cash | ...................... | G06F 16/951 |
| 2017/0293659 A1* | 10/2017 | Huang | ..................... | H03M 7/30 |
| 2017/0372077 A1 | 12/2017 | D'Angelo et al. | | |
| 2018/0309579 A1* | 10/2018 | Martin | ................ | G06F 21/6245 |
| 2019/0087589 A1 | 3/2019 | Eliazar et al. | | |
| 2019/0363870 A1* | 11/2019 | Wagner | ................ | G06Q 20/401 |
| 2020/0259643 A1* | 8/2020 | Pazhoor | .............. | G06F 21/6227 |
| 2020/0349559 A1* | 11/2020 | Setia | .................. | G06Q 20/3827 |
| 2020/0372394 A1* | 11/2020 | Kulkarni | ............... | H04L 9/085 |
| 2021/0021408 A1* | 1/2021 | Roy | ........................ | H04L 63/12 |
| 2021/0072088 A1* | 3/2021 | Van Der Pasch | ..... | G03F 7/0002 |
| 2021/0168122 A1* | 6/2021 | Merritt | ...................... | H04L 9/36 |

OTHER PUBLICATIONS

A. Lapets et al., "Role-Based Ecosystem for the Design, Development, and Deployment of Secure Multi-Party Data Analytics Applications," 2019 IEEE Cybersecurity Development (SecDev), 2019, pp. 129-140, doi: 10.1109/SecDev.2019.00023.*

* cited by examiner

MASKING TEXT DATA FOR SECURE MULTIPARTY COMPUTATION

BACKGROUND

The disclosure relates generally to categorical masking of textual data from multiple parties and more specifically to transforming the masked data to original form in a secure multiparty computation scenario while preserving privacy.

Secure multiparty computation (sMPC) allows multiple parties to participate in a joint computation by sharing data in encrypted form. In a typical sMPC context, data contributors/participants share masked private data. A broker/service provider provides hardware and software infrastructure for executing the computation in question. An analyst is a party that devises the computation using the contributed data and derives insights or generates reports on the computational results from the masked private data.

For sMPC applications that involve artificial intelligence (AI) and machine learning (ML) algorithms, data mining or pre-processing is often useful in determining most determinant and least determinant inputs (i.e. features) for a favorable outcome. In many cases such features can be name, gender, education, profession, marital status, employer, etc., which are classified as Personal Identifiable Information (PII). However, many data regulations mandate protection of personal data.

SUMMARY

An illustrative embodiment provides a computer-implemented method for textual masking for multiparty computation. The method comprises receiving masked input data from a number of contributors, wherein the input data from each contributor has a unique contributor mask value. A unique analyst mask factor is received for each contributor, computed by an analyst as a difference between a uniform analyst mask value and the contributor mask value. An API call is received from the analyst to aggregate the input data from the contributors. The respective analyst mask factors are added to the input data from the contributors, and the data is aggregated and shuffled. Computational results received from the analyst based on the aggregated input data are published. In response to API calls from the contributors, the analyst mask factors are removed from the computational results, wherein computational results received by each contributor are masked only by the respective contributor mask value.

Another illustrative embodiment provides a computer program product for textual masking for multiparty computation. The computer program product comprises a non-volatile computer readable storage medium having program instructions embodied therewith, the program instructions executable by a number of processors to cause the computer to perform the steps of: receiving masked input data from a number of contributors, wherein the input data from each contributor has a unique contributor mask value added by that contributor; receiving a unique analyst mask factor for each contributor computed by an analyst as a difference between a uniform analyst mask value and the contributor mask value; receiving an application programming interface (API) call from the analyst to aggregate the input data from the contributors; adding the respective analyst mask factors to the masked input data from the corresponding contributors; aggregating and randomly shuffling the input data from the contributors; receiving and publishing computational results from the analyst based on the aggregated input data; removing the respective analyst mask factors from the computational results in response to API calls from the contributors, wherein computational results for each contributor are masked only by the respective contributor mask value added by that contributor; and sending the computational results to the contributors.

Another illustrative embodiment provides a system for textual masking for multiparty computation. The system comprises a bus system; a storage device connected to the bus system, wherein the storage device stores program instructions; and a number of processors connected to the bus system, wherein the number of processors execute the program instructions to: receive masked input data from a number of contributors, wherein the input data from each contributor has a unique contributor mask value added by that contributor; receive a unique analyst mask factor for each contributor computed by an analyst as a difference between a uniform analyst mask value and the contributor mask value; receive an application programming interface (API) call from the analyst to aggregate the input data from the contributors; add a uniform broker mask value and the respective analyst mask factors to the masked input data from the corresponding contributors; aggregate and randomly shuffle the input data from the contributors; receive and publish computational results from the analyst based on the aggregated input data; remove the uniform broker mask value and the respective analyst mask factors from the computational results in response to API calls from the contributors, wherein computational results for each contributor are masked only by the respective contributor mask value added by that contributor; and send the computational results to the contributors.

DETAILED DESCRIPTION

The illustrative embodiments recognize and take into account one or more different considerations. Illustrative embodiments recognize and take into account that many data regulations mandate protection of personal data, which complicates gaining access to data that is often critical for secure multiparty computation (sMPC). The illustrative embodiments provide the technical solution of preserving the privacy of sensitive information collected from data contributors that wish to participate in sMPC.

Illustrative embodiments recognize and take into account that many existing sMPC applications do not deal with textual data at large. In many sMPC applications, a trusted third party automatically masks sensitive data, mostly numeric data, after splitting it as shares in a homomorphic representation with other contributors before performing joint computation. The illustrative embodiments provide the technical solution of enabling data contributors to uniquely mask sensitive textual data offline and validate that the encrypted form does not reveal any personal identifiable information before providing the data to a third party.

Illustrative embodiments provide a method of masking textual data for sMPC. Data contributors convert sensitive text data to UNICODE, which is then masked with a random mask value that is unique to each contributor. The masked UNICODE is then converted back to a character string before encryption. Therefore, the original sensitive information is not revealed to third parties involved in the sMPC because the data is uniquely masked by contributors before being shared. Third parties, even trusted ones, cannot gain any useful insights about the shared information because the third party only see masked or encoded data. Therefore, privacy is preserved.

By adding a normalizing mask to the data received from different contributors, illustrative embodiments generate a uniformly masked representation of textual data from all contributors, even when each data contributor masks its own data with a different key.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
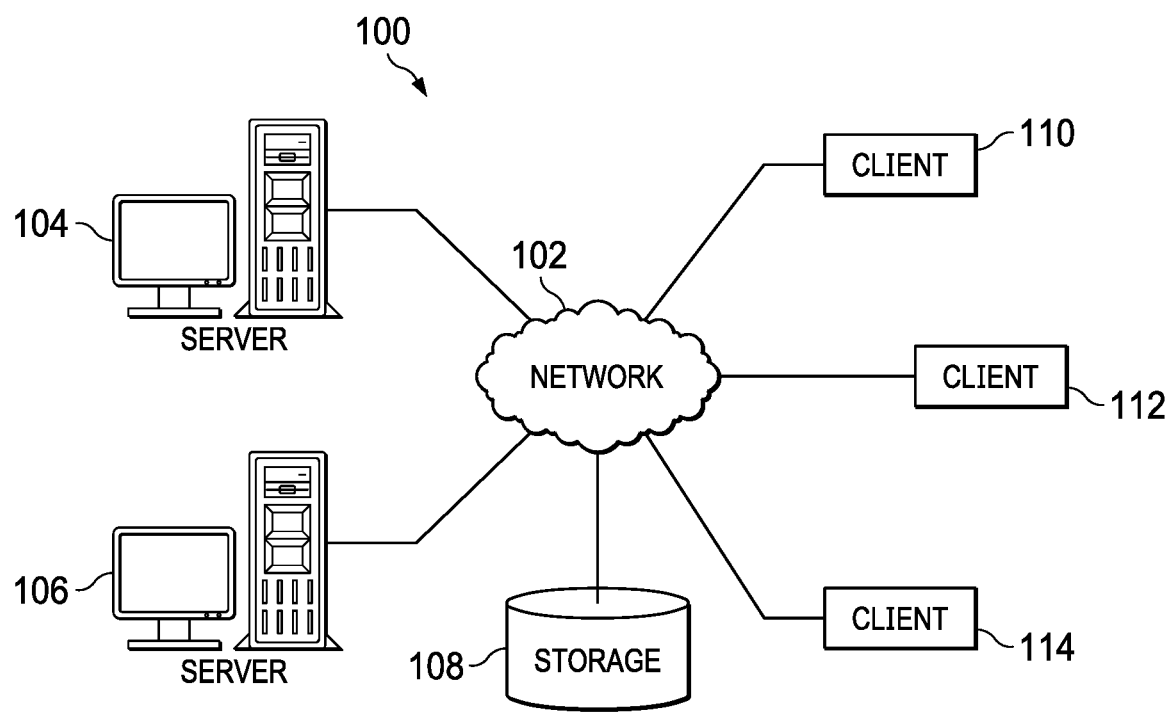
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
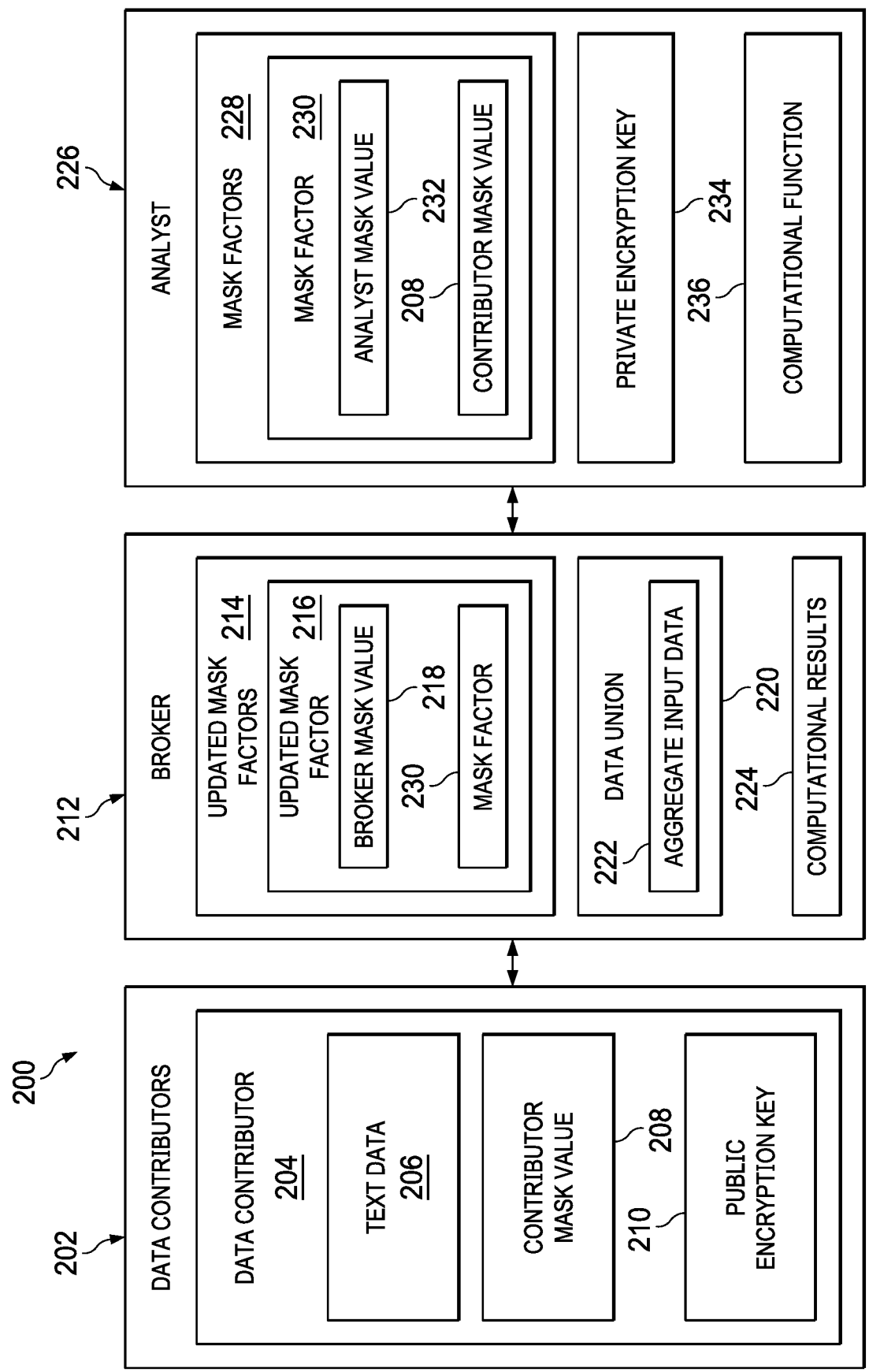
FIG. 2 illustrates a block diagram of a system for masking textual data for multiparty computation in accordance with an illustrative embodiment.

FIG. 2 illustrates a block diagram of a system for masking textual data for multiparty computation in accordance with an illustrative embodiment. Secure multiparty computational system 200 comprises three types of parties: data contributors 202, a broker/service provider 212, and an analyst 226. Data contributors 202 might be implemented as client computers such as clients 110, 112 in FIG. 1 communicating over a network such as network 102. Similarly, analyst 226 might be implement as a client such client 114. Broker 212 might be implemented as a server such server 104 in FIG. 1.

Each data contributor 204 among the data contributors 202 comprises sensitive text data 206 that can be contributed to a pool of input data for use by the analyst 226. At the same time, the contributor 204 also wants to keep the sensitive information confidential to itself. For example, a car dealer might want to know potential customer segments to which it can market a new product based on customer segment analysis of previous purchases from itself and other car dealers. However, car dealers cannot share personal identifiable information about customers with third parties due to privacy regulations. Therefore, to preserve data privacy while still being able to share sensitive information, data contributor 204 masks the data with a unique, randomly generated, contributor mask value 208 that only the contributor 204 knows before sharing the data with broker 212 (see FIG. 4). The mask value 208 is encrypted with a public encryption key 210 from an encryption key pair generated by the analyst 226.

Analyst 226 comprises a computational function 236 that is performed on a data union 220 of contributed data provided by broker 212. Because data contributors 202 use different unique mask values to mask their respective data, analyst 226 generates a normalizing, analyst mask value 232 that is applied uniformly to masked data from all contributors 202 to generate respective mask factors 228 for each contributor. Therefore, for each data contributor, such as data contributor 204, analyst 226 generates a corresponding mask factor 230 that comprises the unique mask value 208 of the contributor 204 and a uniform analyst mask value 232 that is the same for all data contributors 202 (see FIG. 5).

The normalizing mask factors 228 incorporating the uniform analyst mask value 232 make it possible to have a similar masked representation of text data from all contributors 202 even when the contributors initially mask their respective data with different values.

Analyst 226 uses a private encryption key 234 from the encryption key pair to decode the respective contributor mask values in order to compute the mask factors 228. It should be emphasized that the private encryption key 234 is only used to decode the contributors' mask values, not the original, underlying data to which those masks are applied. Analyst 226 never gains access to the original data from any contributor, such as text data 206.

Broker 212 comprises a data union 220 formed from the aggregate input data 222 shared by all of the data contributors 202. Data union 220 is formed by broker 212 in response to an application protocol interface (API) call from analyst 226. Broker 212 applies the normalizing mask factors 228 generated by analyst 226 to normalize the contributed data before it is aggregated into data union 220.

As an additional layer of privacy protection, broker 212 generates its own uniform mask value 218 which is unknown to analyst 226. The broker mask value 218 is added to the mask factors 228 provided by analyst 226 to created updated mask factors 214 (see FIG. 6). Each updated mask factor, such as updated mask factor 216, comprises the unique analyst mask factor 230 generated by analyst 226 and the uniform broker mask value 218 generated by broker 212.

Therefore, data shared by each contributor has three mask values applied to it before it is used in the multiparty computation: 1) a unique mask value generated by that contributor, 2) an analyst mask value, and 3) a broker mask value.

Broker 212 publishes computational results 224 produced by analyst 226 from the application of computational function 236 to data union 220.

In the illustrative embodiment, data contributors 202, broker 212, and analyst 226 can be implemented in software, hardware, firmware or a combination thereof. When software is used, the operations performed by data contributors 202, broker 212, and analyst 226 can be implemented in program code configured to run on hardware, such as a processor unit. When firmware is used, the operations performed by data contributors 202, broker 212, and analyst 226 can be implemented in program code and data, and stored in persistent memory to run on a processor unit. When hardware is employed, the hardware may include circuits that operate to perform the operations in data contributors 202, broker 212, and analyst 226.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem of preserving data privacy in sMPC. One or more technical solutions provide multiple mask values to sensitive data. As a result, one or more technical solutions may provide a technical effect of preventing third parties from gain access to and decoding the original data shared by contributors. One or more technical solutions also provide a technical effect of allowing data contributors to benefit from multiparty computation regarding attributes of sensitive data they possess without compromising the privacy of that data.

Figure 3:
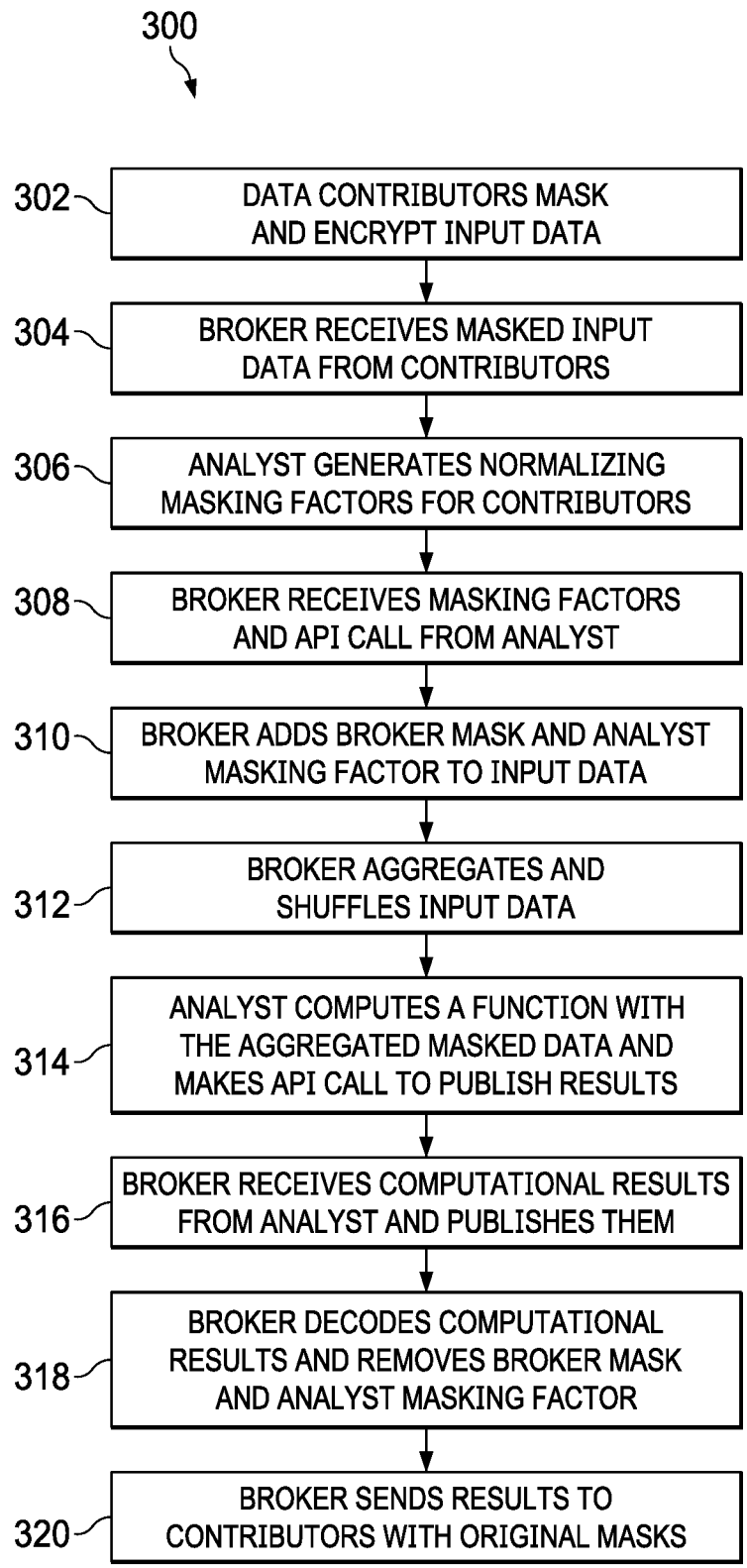
FIG. 3 depicts a flowchart of a process for secure multiparty computation in accordance with illustrative embodiments.

FIG. 3 depicts a flowchart of a process for sMPC in accordance with illustrative embodiments. Process 300 can be implemented with multiple parties such as data contributors 202, broker 212, and analyst 226 shown in FIG. 2. Process 300 begins with the contributors masking and encrypting their respective data, wherein the input data from each contributor has a unique contributor mask value added by that contributor (step 302).

The broker receives the masked, encrypted input data from the contributors (step 304). The analyst normalizes the data masking by decoding the contributor mask values and generating a unique analyst mask factor for each contributor computed as a difference between a uniform analyst mask value and the contributor mask value (step 306).

The broker receives the analyst mask values from the analyst and an API call from the analyst to aggregate the input data from the contributors (step 308). The broker adds the respective analyst mask factors, and a uniform broker mask value, to the masked input data from the corresponding contributors (step 310). The broker then aggregates and randomly shuffles the input data from the contributors (step 312).

The analyst computes a function with the aggregated masked input data and makes an API call to the broker to publish the computational results (step 314).

The broker receives and publishes the computational results from the analyst based on the aggregated input data (step 316). In response to API calls from the contributors, the broker decodes the computational results and removes the respective analyst mask factors and broker mask value from the computational results, wherein computational results for each contributor are masked only by the respective contributor mask value added by that contributor (step 318). The broker then sends the computational results to the data contributors (step 320).

Figure 4:
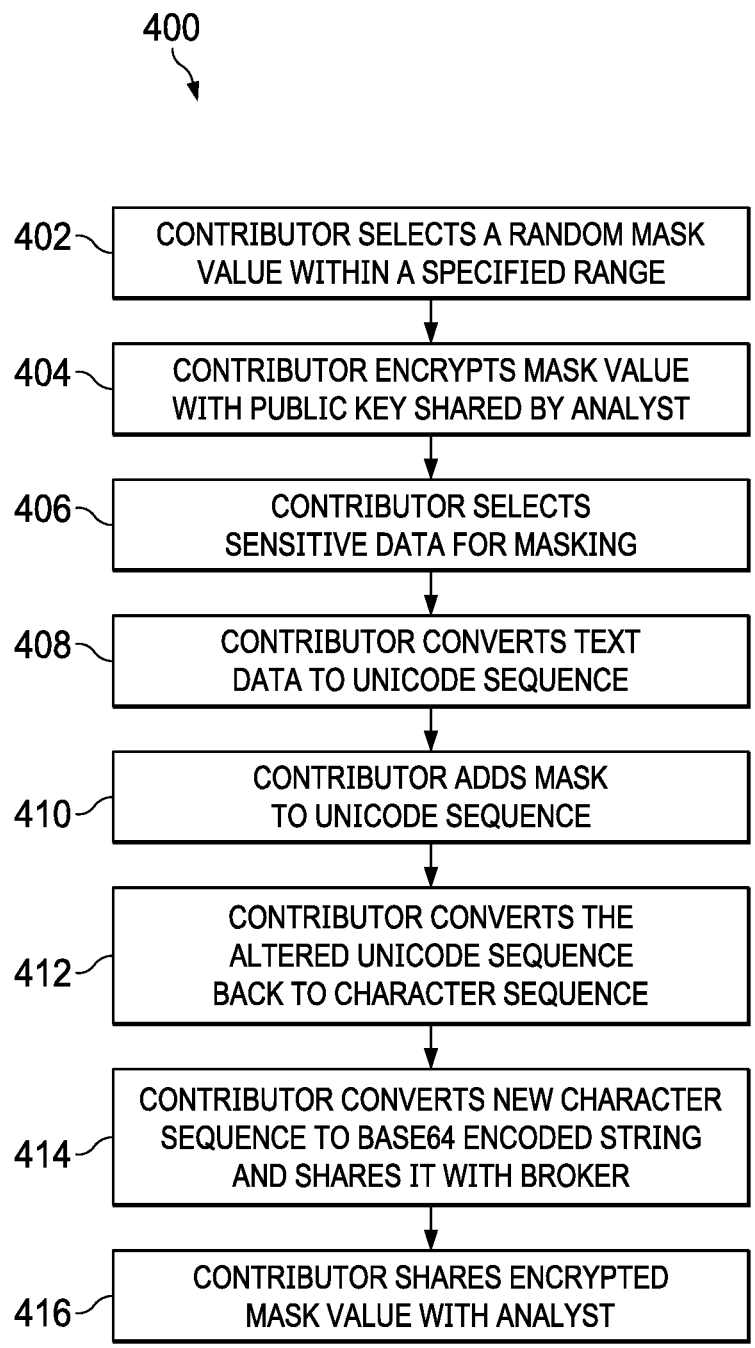
FIG. 4 depicts a flowchart of a process for masking data by a contributor for secure multiparty computation in accordance with illustrative embodiments.

FIG. 4 depicts a flowchart of a process for masking data by a contributor for sMPC in accordance with illustrative embodiments. Process 400 is a more detailed explanation of step 302 in FIG. 3. Process 400 begins with a contributor randomly selecting a mask value (number) within a specified range (step 402). The contributor encrypts this mask value using a public key shared by the analyst (step 404). In an embodiment, the contributor can optionally select specific sensitive data (e.g., personal data) for masking instead of simply masking all of the data (step 406).

The contributor then converts the character sequence of the text data to a UNICODE sequence (step 408). UNICODE is a computing industry standard that is used to encode text data by using a number to represent characters. UNICODE provides a unique number for every character, regardless of platform device, application, or language. The contributor then adds the mask value to the UNICODE sequence (step 410). The contributor converts the altered UNICODE sequence back to a character sequence (step 412). For example, the personal identifiable text to be masked might be the word "male." The contributor chooses a mask value of 1000. The UNICODE representation of the letters in "male" is: 109 97 108 101. Adding the masking value of 1000 to the UNICODE sequence produces the altered sequence: 001109 001097 001108 001101. Converting this altered UNICODE sequence back to a character sequences produces: ѕщеэ.

The contributor converts the new character sequence to a base64 encoded string and shares is with the broker (step 414). Base64 is an encoding scheme used to encode binary data that needs to be stored and transferred over media that designed to deal with textual data. This encoding helps to ensure that the data remains intact during transport. Continuing the example above, applying base64 encoding on the masked character sequence ѕщеэ forms: 0ZXRidGU0Y0=. Therefore, applying the steps 402-414 to the text "male" produces the masked form 0ZXRidGU0Y0=.

The contributor shares the encrypted mask value (in the above example, 1000) with the analyst (step 416). The enables the analyst to normalize the masking from multiple contributors, explained in more detail below.

Figure 5:
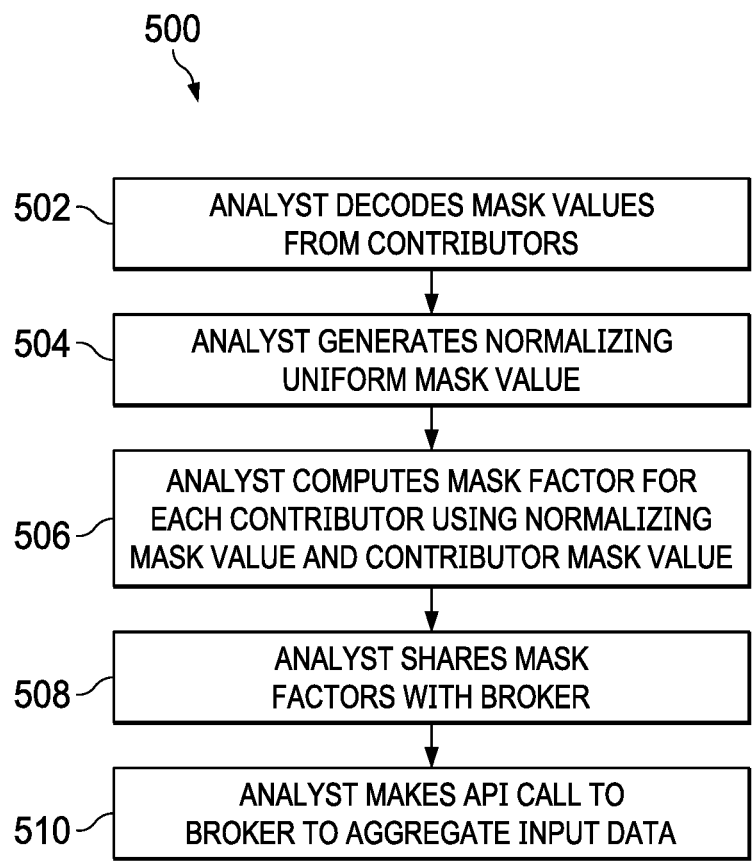
FIG. 5 depicts a flowchart of a process for normalizing masked data by an analyst for secure multiparty computation in accordance with illustrative embodiments.

FIG. 5 depicts a flowchart of a process for normalizing masked data by an analyst for sMPC in accordance with illustrative embodiments. Process 500 is a more detailed explanation of step 306 in FIG. 3. The analyst uses the private key from the encryption key pair to decode the encrypted mask values shared by each data contributors (step 502). The analyst generates a normalizing mask value of its own (step 504). This analyst mask value is used to ensure that the input data aggregated by the broker has a normalizing mask that uniformly alters the different UNICODE sequences based on the text data supplied by the contributors.

The analyst then computes a unique mask factor for each contributor using the normalizing mask value and the contributor mask value (step 506). For example, if there are three contributors, and their respective mask values can be represented by as a, b, and c. The analyst generates a normalizing analyst mask value, d. Applying these values, the analyst computes a unique masking factor, m, for each contributor as a difference between the normalizing mask value and the contributor's mask value. Therefore, the respective masking factors for the contributors are, m1=d−a, for Contributor 1
m1=d−b, for Contributor 2
m3=d−c, for Contributor 3

The analyst shares the respective mask factors with the broker (step 508) and makes an API call to the broker to aggregate the input data from the contributors (step 510).

Figure 6:
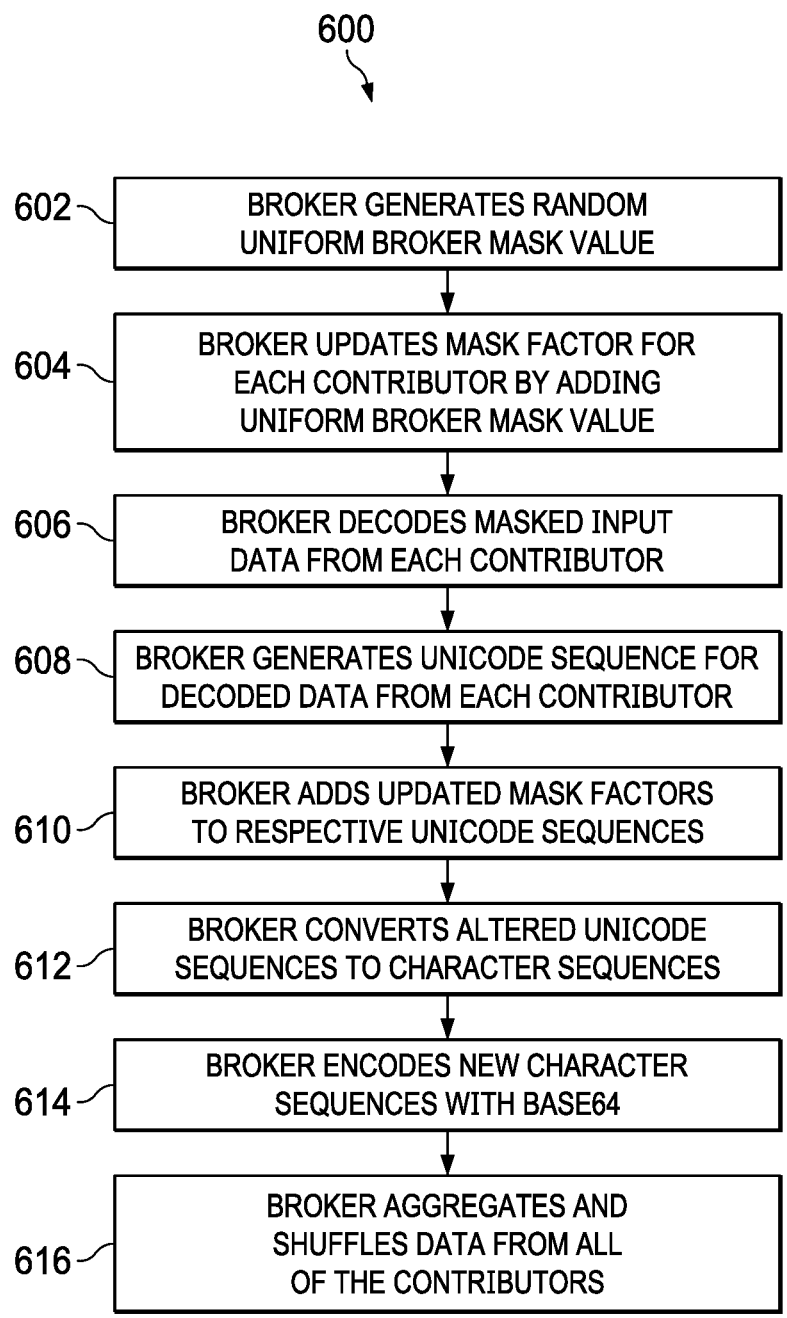
FIG. 6 depicts a flowchart of a process for randomizing mask factors and aggregating input data by a broker for secure multiparty computation in accordance with illustrative embodiments.

FIG. 6 depicts a flowchart of a process for randomizing mask factors and aggregating input data by a broker for sMPC in accordance with illustrative embodiments. Process 600 is a more detailed explanation of steps 310-312 in FIG. 3. After receiving the API call and mask factors for each contributor from the analyst, the broker generates a random mask factor, e, of its own (step 602). This additional broker mask value ensures that the analyst cannot decode the masked data with the mask factors, m, that it computed. The broker updates the mask factors received from the analyst by adding the broker mask value, e, to them (step 604). Using the example from FIG. 5, the broker generates updated mask factors, f, for the contributors as, f1=m1+e, for Contributor 1
f2=m2+e, for Contributor 2
f3=m3+e, for Contributor 3

The broker decodes the base64 strings to generate the masked character sequence received from each contributor (step 606). The broker generates a UNICODE value sequence for the masked character sequence from each contributor (step 608).

The broker alters the UNICODE sequences by adding the respective update mask factors, f, for the corresponding contributor (step 610). The broker then converts the altered UNICODE sequences back to character sequences (step 612) and encodes the new character sequences with base64 (step 614).

The broker aggregates the encoded, masked data from all of the contributors and randomly shuffles it (step 616). At this point, the analyst can run the analysis on the union masked data and publish to the broker. Because the union data has unknown updated masking factors due to the addition of the broker mask value, the analyst cannot decode the actual input data from the contributors.

Figure 7:
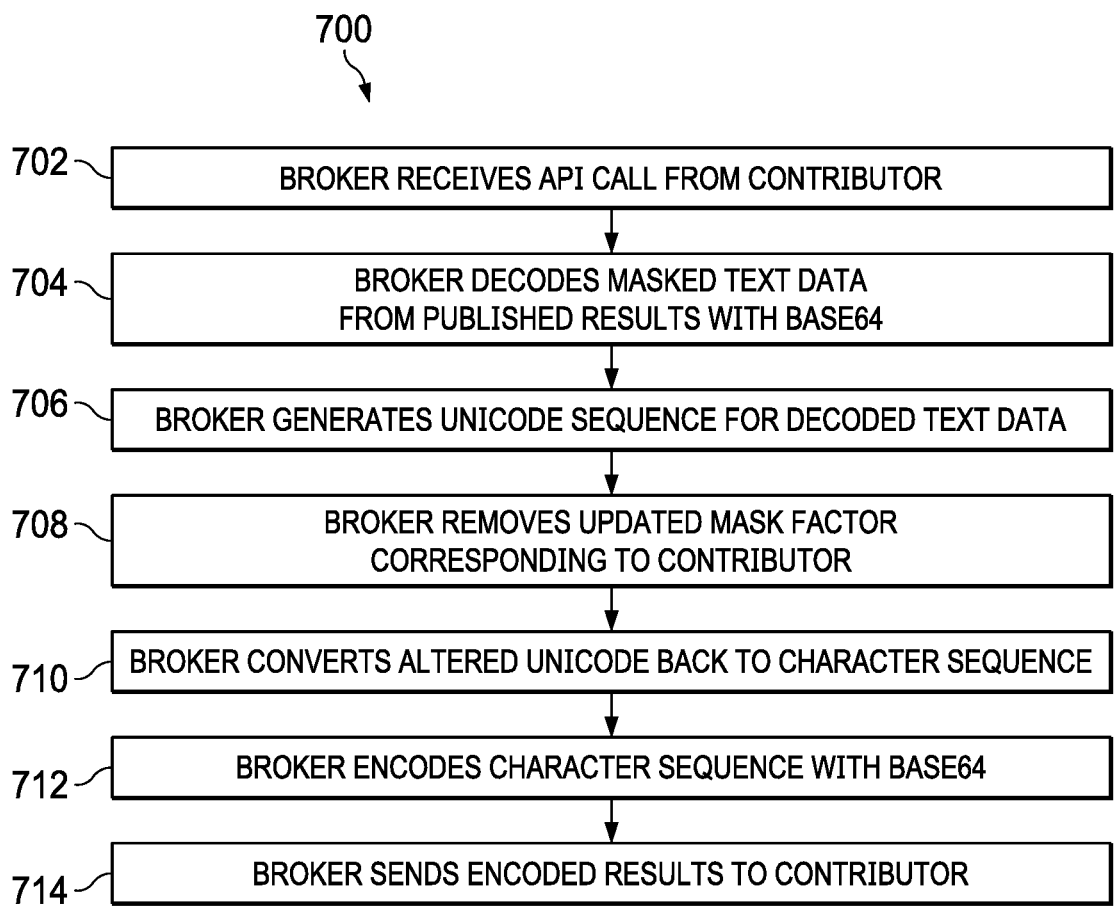
FIG. 7 depicts a flowchart of a process for de-scaling mask factors by a broker for secure multiparty computation in accordance with illustrative embodiments.

FIG. 7 depicts a flowchart of a process for de-scaling mask factors by a broker for sMPC in accordance with illustrative embodiments. Process 700 is a more detailed explanation of steps 318-320 in FIG. 3. The broker receives an API call from one or more contributors to provide the computational results of the analysis (step 702) and decodes the masked textual data from the computational results with base64 decoding to generate a character sequence (step 704).

The broker generates a UNICODE value for the decoded character sequence (step 706). For each contributor, the broker subtracts the respective updated masking factor, f, from the UNICODE value (step 708), which includes both the uniform broker mask value, e, and the mask factor, m, generated by the analyst. Therefore, the computational results destined for each contributor are masked only by the original mask value added by the contributor.

The respective descaled UNICODE sequences are then converted back to character sequences (step 710) and encoded with base64 (step 712). The broker sends the encoded computational results to each respective contributor (step 714).

Figure 8:
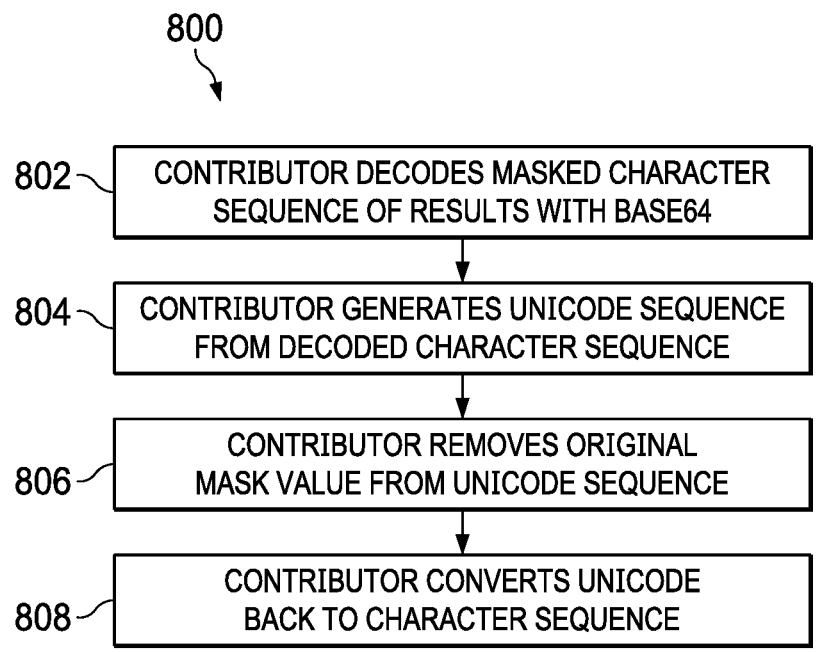
FIG. 8 depicts a flowchart of a process for decoding and unmasking data by a contributor for secure multiparty computation in accordance with illustrative embodiments.

FIG. 8 depicts a flowchart of a process for decoding and unmasking data by a contributor for sMPC in accordance with illustrative embodiments. Process 800 is a more detailed explanation of step 320 in FIG. 3. The contributor decodes the masked character sequence of the computational results with based64 decoding (step 802). The contributor then generates a UNICODE sequence from the decoded character string (step 804).

The contributor removes the original mask value, e.g., 1000, from the UNICODE sequence (step 806). The contributor can then convert the UNICODE back to a character sequence (step 808), which provides the contributor with normal text for the computational results.

Figure 9:
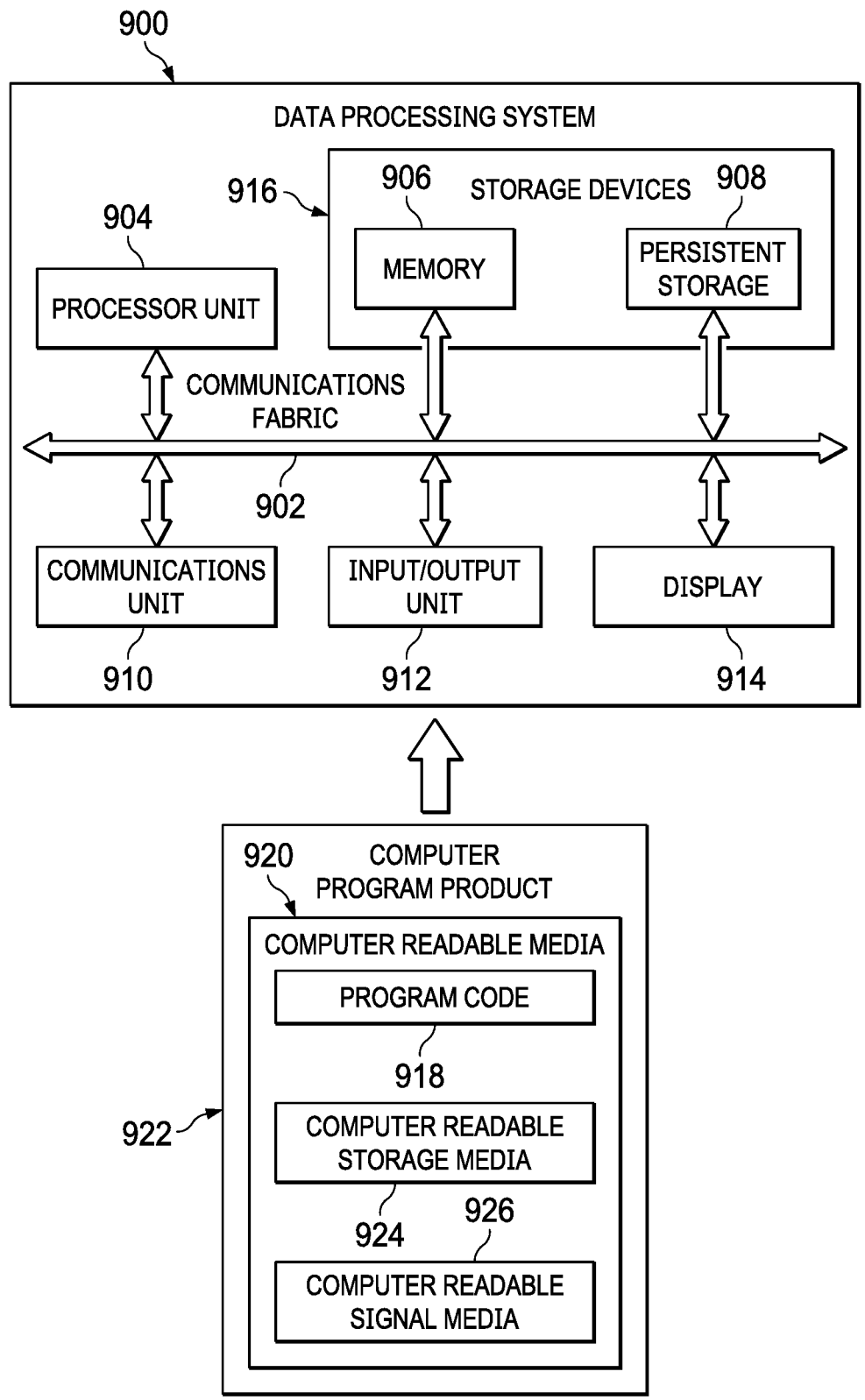
FIG. 9 is a diagram of a data processing system is depicted in accordance with an illustrative embodiment.

Turning to FIG. 9, a diagram of a data processing system is depicted in accordance with an illustrative embodiment. Data processing system 900 is an example of a system in which computer-readable program code or program instructions implementing processes of illustrative embodiments may be run. Data processing system 900 may be an example of one system in which server 104 or clients 112 in FIG. 1 may be implemented. In this illustrative example, data processing system 900 includes communications fabric 902, which provides communications between processor unit 904, memory 906, persistent storage 908, communications unit 910, input/output unit 912, and display 914.

Processor unit 904 serves to execute instructions for software applications and programs that may be loaded into memory 906. Processor unit 904 may be a set of one or more hardware processor devices or may be a multi-processor core, depending on the particular implementation. Further, processor unit 904 may be implemented using one or more heterogeneous processor systems, in which a main processor is present with secondary processors on a single chip. As another illustrative example, processor unit 904 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 906, in these examples, may be, for example, a random access memory, or any other suitable volatile or non-volatile storage device. Persistent storage 908 may take various forms, depending on the particular implementation. For example, persistent storage 908 may contain one or more devices. For example, persistent storage 908 may be a hard drive, a flash memory, a rewritable optical disk, a rewritable magnetic tape, or some combination of the above. The media used by persistent storage 908 may be removable. For example, a removable hard drive may be used for persistent storage 908.

Communications unit 910, in this example, provides for communication with other computers, data processing systems, and devices via network communications unit 910 may provide communications using both physical and wireless communications links. The physical communications link may utilize, for example, a wire, cable, universal serial bus, or any other physical technology to establish a physical communications link for data processing system 900. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 900.

Input/output unit 912 allows for the input and output of data with other devices that may be connected to data processing system 900. For example, input/output unit 912 may provide a connection for user input through a keypad, keyboard, and/or some other suitable input device. Display 914 provides a mechanism to display information to a user and may include touch screen capabilities to allow the user to make on-screen selections through user interfaces or input data, for example.

Instructions for the operating system, applications, and/or programs may be located in storage devices 916, which are in communication with processor unit 904 through communications fabric 902. In this illustrative example, the instructions are in a functional form on persistent storage 908. These instructions may be loaded into memory 906 for running by processor unit 904. The processes of the different embodiments may be performed by processor unit 904 using computer-implemented program instructions, which may be located in a memory, such as memory 906. These program instructions are referred to as program code, computer-usable program code, or computer-readable program code that may be read and run by a processor in processor unit 904. The program code, in the different embodiments, may be embodied on different physical computer-readable storage devices, such as memory 906 or persistent storage 908.

Program code 918 is located in a functional form on computer-readable media 920 that is selectively removable and may be loaded onto or transferred to data processing system 900 for running by processor unit 904. Program code 918 and computer-readable media 920 form computer program product 922. In one example, computer-readable media 920 may be computer-readable storage media 924 or computer-readable signal media 926. Computer-readable storage media 924 may include, for example, an optical or magnetic disc that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory that is connected to data processing system 900. In some instances, computer-readable storage media 924 may not be removable from data processing system 900.

Alternatively, program code 918 may be transferred to data processing system 900 using computer-readable signal media 926. Computer-readable signal media 926 may be, for example, a propagated data signal containing program code 918. For example, computer-readable signal media 926 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 918 may be downloaded over a network to persistent storage 908 from another device or data processing system through computer-readable signal media 926 for use within data processing system 900. For instance, program code stored in a computer-readable storage media in a data processing system may be downloaded over a network from the data processing system to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of executing program code. As one example, data processing system 900 may include organic components integrated with inorganic components and/or may be comprised entirely of organic components excluding a human being. For example, a storage device may be comprised of an organic semiconductor.

As another example, a computer-readable storage device in data processing system 900 is any hardware apparatus that may store data. Memory 906, persistent storage 908, and computer-readable storage media 924 are examples of physical storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906 or a cache such as found in an interface and memory controller hub that may be present in communications fabric 902.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for textual masking for multiparty computation, the method comprising:
    receiving, by a number of processors, masked input data from a number of contributors, wherein the masked input data from each individual contributor has a unique contributor mask value added by the individual contributor;
    receiving, by the number of processors, a unique analyst mask factor for each individual contributor computed by an analyst as a difference between a uniform analyst mask value and the unique contributor mask value added by the individual contributor;
    receiving, by the number of processors, an application programming interface (API) call from the analyst to aggregate the masked input data from the number of contributors;
    decoding, by the number of processors, the masked input data from each individual contributor;
    adding, by the number of processors, the unique analyst mask factor for each individual contributor to the masked input data from each individual contributor;
    encrypting, by the number of processors, the masked input data from each individual contributor;
    aggregating and randomly shuffling, by the number of processors, the masked input data from the number of contributors;
    receiving and publishing, by the number of processors, computational results from the analyst based on the aggregated masked input data;
    decoding, by the number of processors, the computational results from the analyst;
    responsive to an API call from a contributor from among the number of contributors:
        removing, by the number of processors, the unique analyst mask factor for the contributor from the computational results, wherein, for the contributor, the computational results are masked only by the unique contributor mask value added by that contributor;
        encrypting, by the number of processors, the computational results after removing the unique analyst mask factor for the contributor; and
        sending, by the number of processors, the computational results to the contributor.

2. The method of claim 1, wherein the masked input data received from each individual contributor comprises a first character sequence converted to a UNICODE sequence, wherein the unique contributor mask value for a contributor is added to the UNICODE sequence and converted to a second character sequence that is encoded with base64 encoding.

3. The method of claim 2, further comprising:
    generating, by the number of processors, a UNICODE sequence for the masked input data received from each individual contributor before adding the unique analyst mask factor for the contributor; and
    generating, by the number of processors, a UNICODE sequence for the computational results received from the analyst before removing the unique analyst mask factor.

4. The method of claim 1, wherein the masked input data and the computational results are base64 encoded.

5. The method of claim 1, further comprising:
    adding a uniform broker mask value to the masked input data from each individual contributor; and
    removing the uniform broker mask value from the computational results before sending the computational results to the individual contributors.

6. The method of claim 1, wherein the unique contributor mask value received from each contributor is encrypted with a public encryption key provided by the analyst.

7. The method of claim 1, wherein analyst produces the computational results by applying a computational function to a data union formed from the aggregated masked data input provided by all of the contributors.

8. A computer program product for textual masking for multiparty computation, the computer program product comprising:

a non-volatile computer readable storage medium having program instructions embodied therewith, the program instructions executable by a number of processors to cause the computer to perform the steps of:
receiving masked input data from a number of contributors, wherein the masked input data from each individual contributor has a unique contributor mask value added by the individual contributor;
receiving a unique analyst mask factor for each individual contributor computed by an analyst as a difference between a uniform analyst mask value and the unique contributor mask value added by the individual contributor;
receiving an application programming interface (API) call from the analyst to aggregate the masked input data from the number of contributors;
adding the unique analyst mask factor for each individual contributor to the masked input data from each individual contributor;
encrypting the masked input data from each individual contributor;
aggregating and randomly shuffling the masked input data from the number of contributors;
receiving and publishing computational results from the analyst based on the aggregated masked input data;
decoding the computational results from the analyst;
responsive to an API call from a contributor from among the number of contributors:
removing the unique analyst mask factor for the contributor from the computational results, wherein, for the contributor, the computational results are masked only by the unique contributor mask value added by that contributor;
encrypting the computational results after removing the unique analyst mask factor for the contributor; and
sending the computational results to the contributor.

9. The computer program product of claim 8, wherein the masked input data received from each individual contributor comprises a first character sequence converted to a UNICODE sequence, wherein the unique contributor mask value for a contributor is added to the UNICODE sequence and converted to a second character sequence that is encoded with base64 encoding.

10. The computer program product of claim 9, further comprising instructions for:
generating a UNICODE sequence for the masked input data received from each individual contributor before adding the unique analyst mask factor for the contributor; and
generating a UNICODE sequence for the computational results received from the analyst before removing the unique analyst mask factor.

11. The computer program product of claim 8, wherein the masked input data and the computational results are base64 encoded.

12. The computer program product of claim 8, further comprising instructions for:
adding a uniform broker mask value to the masked input data from each individual contributor; and
removing the uniform broker mask value from the computational results before sending the computational results to the individual contributors.

13. The computer program product of claim 8, wherein the unique contributor mask value received from each contributor is encrypted with a public encryption key provided by the analyst.

14. The computer program product of claim 8, wherein analyst produces the computational results by applying a computational function to a data union formed from the aggregated masked data input provided by all of the contributors.

15. A system for textual masking for multiparty computation, the system comprising:
a bus system;
a storage device connected to the bus system, wherein the storage device stores program instructions; and
a number of processors connected to the bus system, wherein the number of processors execute the program instructions to:
receive masked input data from a number of contributors, wherein the masked input data from each individual contributor has a unique contributor mask value added by the individual contributor;
receive a unique analyst mask factor for each individual contributor computed by an analyst as a difference between a uniform analyst mask value and the unique contributor mask value added by the individual contributor;
receive an application programming interface (API) call from the analyst to aggregate the masked input data from the number of contributors;
decode the masked input data from each individual contributor;
add a uniform broker mask value and the unique analyst mask factor for each individual contributor to the masked input data from each individual contributor;
encrypt the masked input data from each individual contributor;
aggregate and randomly shuffle the masked input data from the number of contributors;
receive and publish computational results from the analyst based on the aggregated masked input data;
decoding the computational results from the analyst;
responsive to an API call from a contributor from among the number of contributors:
remove the uniform broker mask value and the unique analyst mask factor for the contributor from the computational results, wherein, for the contributor, the computational results are masked only by the unique contributor mask value added by that contributor;
encrypt the computational results after removing the unique analyst mask factor for the contributor; and
send the computational results to the contributor.

16. The system according to claim 15, wherein the masked input data received from each individual contributor comprises a first character sequence converted to a UNICODE sequence, wherein the unique contributor mask value for a contributor is added to the UNICODE sequence and converted to a second character sequence that is encoded with base64 encoding.

17. The system according to claim 16, wherein the number of processors further execute instructions to:
generate a UNICODE sequence for the masked input data received from each individual contributor before adding the unique analyst mask factor for the contributor; and generate a UNICODE sequence for the computational results received from the analyst before removing the unique analyst mask factor.

18. The system according to claim 15, wherein the masked input data and the computational results are base64 encoded.

19. The system according to claim 15, wherein the unique contributor mask value received from each contributor is encrypted with a public encryption key provided by the analyst.

20. The system of claim 15, wherein analyst produces the computational results by applying a computational function to a data union formed from the aggregated masked data input provided by all of the contributors.

* * * * *